United States Patent [19]
Yamamoto et al.

[11] Patent Number: 6,034,206
[45] Date of Patent: Mar. 7, 2000

[54] POLYARYLENEAMINES AND A PROCESS FOR THEIR PRODUCTION

[75] Inventors: Toshihide Yamamoto; Masakazu Nishiyama; Yasuyuki Koie, all of Mie-ken, Japan

[73] Assignee: Tosoh Corporation, Yamaguchi-ken, Japan

[21] Appl. No.: 09/073,064

[22] Filed: May 6, 1998

[30] Foreign Application Priority Data

| May 9, 1997 | [JP] | Japan | 9-119478 |
| Sep. 10, 1997 | [JP] | Japan | 9-245219 |
| Sep. 10, 1997 | [JP] | Japan | 9-245220 |
| Sep. 10, 1997 | [JP] | Japan | 9-245221 |

[51] Int. Cl.⁷ .............................. C08F 12/28; C08G 73/02
[52] U.S. Cl. .................. 528/397; 528/220; 528/223; 528/228; 528/229; 528/422; 528/423; 525/333.3; 525/333.4
[58] Field of Search .................. 528/220, 223, 528/228, 229, 397, 422, 423; 525/333.3, 333.4

[56] References Cited

FOREIGN PATENT DOCUMENTS 9-188756  7/1997  Japan .

OTHER PUBLICATIONS

American Chemical Society, Polymer Preprints, vol. 38, No. 1, Apr. 1997.
Kanbara, et al., Preparation of Novel Poly(aryleneamine)s by Palladium Complex Catalyzed Polycondensation of Dibromobenzenes with Diamines, Chemistry Letter, pp. 1135–1136.

*Primary Examiner*—P. Hampton-Hightower
*Attorney, Agent, or Firm*—Sughrue, Mion, Zinn, Macpeak & Seas. PLLC

[57] ABSTRACT

A novel class of polyaryleneamines improved in physical and chemical properties, particularly in heat resistance and solvent resistance, and a process for producing the same are disclosed: said polymers having tertiary arylamino units bound in series.

15 Claims, 12 Drawing Sheets

POLYARYLENEAMINES AND A PROCESS FOR THEIR PRODUCTION

BACKGROUND OF THE INVENTION

This invention relates to novel polyaryleneamines and a process for producing them. The polyaryleneamines of the invention have such a structure that tertiary arylamino groups are bound in series and, hence, they are useful as structural materials that are improved in heat resistance, solvent resistance and other properties.

Known polymeric materials having high resistance to heat and solvents include thermosetting resins such as phenolics and epoxies, and engineering plastics such as polyphenylene terephthalamides, polyimides, polyether ether ketone, polyphenylene sulfides and liquid-crystal polymers. These polymers are used as structural materials in various fields.

A novel polymer was proposed in Chem. Lett., pp. 1135–1136, 1996 and it is a polyaryleneamine produced by aminating an aryl dihalide and a piperazine or piperidine derivative in the presence of both a base and a catalyst consisting of palladium chloride and a tris(o-tolylphosphine) ligand.

The thermosetting resins mentioned above have high heat resistance but the rate of their production is not very high. The engineering plastics are difficult to process by melting techniques except special ones such as melt spinning. Some engineering plastics are easy to process by ordinary melting techniques but their heat resisting performance is not satisfactory. The manufacture of the engineering plastics involves various other problems such as the difficulty in the synthesis of monomers, the need to perform polymerization in special solvents, the need for high temperatures during polymerization reaction and the low efficiency in the production of shaped articles.

The polymer disclosed in Chem. Lett., pp. 1135–1136, 1996 which is composed of an aryl dihalide and an alicyclic amine (i.e., piperazine or piperidine derivative) is low in heat resistance.

SUMMARY OF THE INVENTION

The present invention has been accomplished under these circumstances and has as an object providing novel polyaryleneamines that are improved in heat resistance, solvent resistance and other properties.

Another object of the invention is to provide a process for producing the novel polyaryleneamines.

As the result of the intensive studies conducted in order to solve the aforementioned problems of the prior art, the present inventors found novel polyaryleneamines and this finding led to the accomplishment of the present invention. Thus, according to its first aspect, the present invention relates to a polyaryleneamine having a structural unit represented by the following general formula (1):

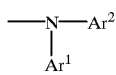

(1)

where $Ar^1$ and $Ar^2$ are each independently an aromatic group having 6–24 carbon atoms. According to its second aspect, the present invention relates to a process for producing the polyaryleneamine.

DETAILED DESCRIPTION OF THE INVENTION

Figure 1:
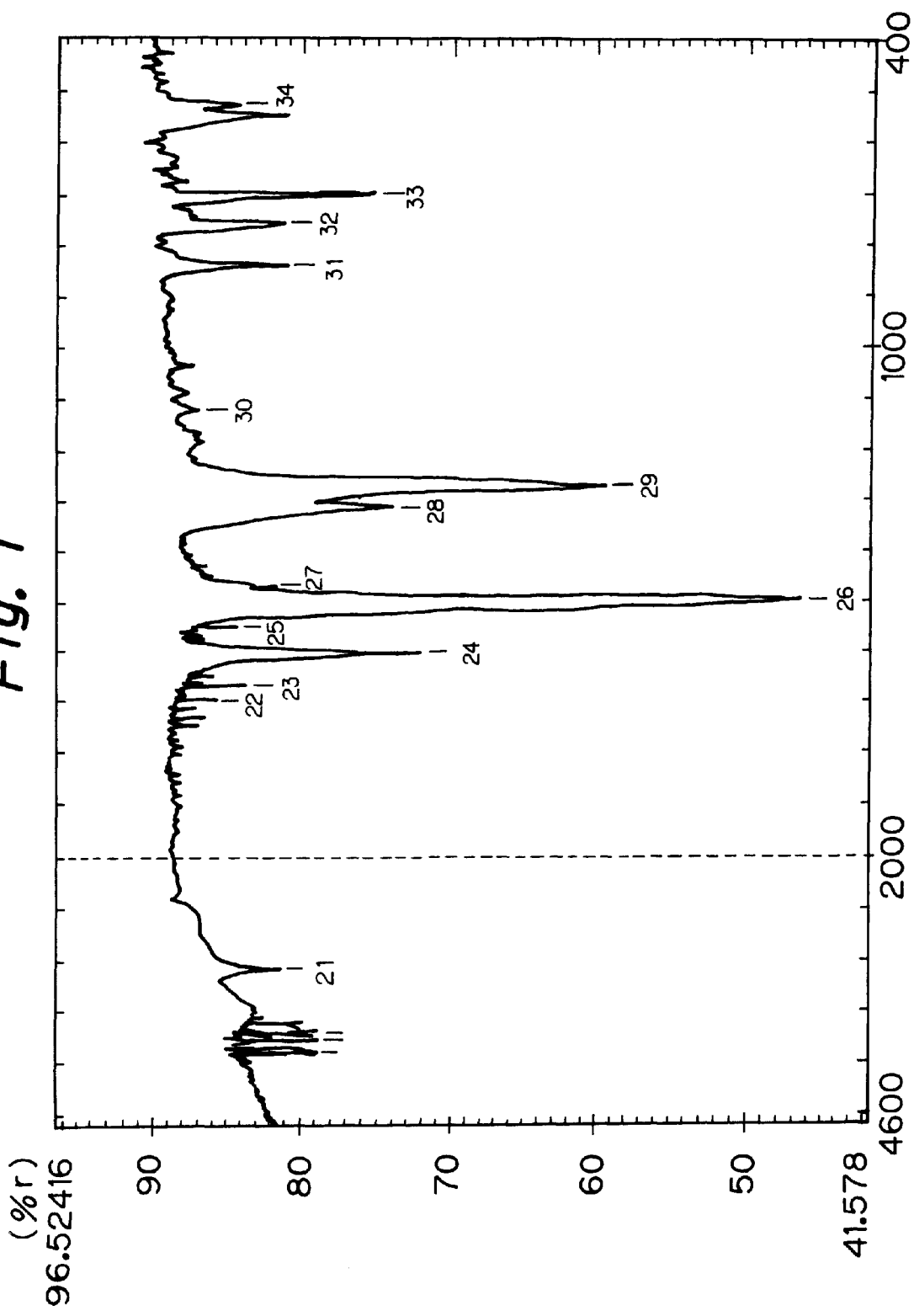
FIG. 1 is an IR chart for the polyaryleneamine prepared in Example 1.

The polyaryleneamines according to the first aspect of the present invention are characterized by having a structural unit represented by the general formula (1), in which $Ar^1$ and $Ar^2$ are each independently an aromatic group having 6–24 carbon atoms. Preferred examples of the aromatic group having 6–24 carbon atoms include substituted or unsubstituted phenyl, biphenyl, anthracenyl, naphthyl and fluorenyl groups.

Specific examples of $Ar^1$ include the following: substituted or unsubstituted phenyl groups such as phenyl, 2-methoxyphenyl, 3-methoxyphenyl, 4-methoxyphenyl, 2-methylphenyl, 3-methylphenyl, 4-methylphenyl, 2-hydroxyphenyl, 3-hydroxyphenyl, 4-hydroxyphenyl, 2-trifluoromethylphenyl, 3-trifluoromethylphenyl, 4-trifluoromethylphenyl, 2,6-dimethylphenyl, 3,6-dimethylphenyl, 2,3-dimethylphenyl, 3,4-dimethylphenyl, 2,4-dimethylphenyl, 3,5-dimethylphenyl, 3-(trifluoromethoxy)phenyl, 4-(trifluoromethoxy)phenyl and 3,4-(methylenedioxy)phenyl; biphenyl groups such as 2-biphenyl, 3-biphenyl and 4-biphenyl; naphthyl groups such as 1-naphthyl, 2-naphthyl, 2-methylnaphthyl and 4-methylnaphthyl; and 9-anthracenyl, 2-fluorenyl, etc.

Exemplary structures of $Ar^2$ are listed below.

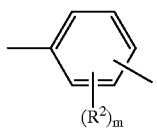

where $R^2$ is a hydrogen atom, an alkyl group having 1–5 carbon atoms or a trifluoromethoxy group; m is an integer of 1 or 2;

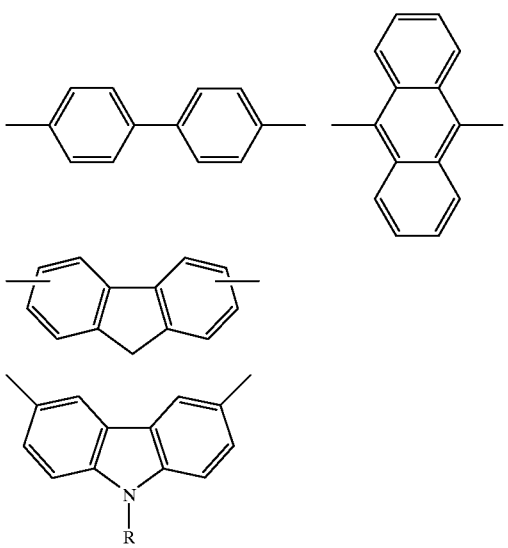

where R is an alkyl group having 1–4 carbon atoms.

Among the polyaryleneamines of the invention, those that have a structural unit represented by the following general formula (15) are particularly preferred, since they have high heat resistance:

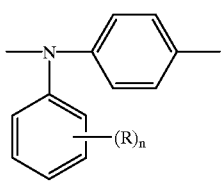

(15)

where R is H or CH$_3$ and n is an integer of 1–5.

If higher heat resistance is particularly important, the polyaryleneamines of the invention preferably have Ar$^2$ bound in para positions. If higher solubility in solvents and better moldability are more important, the polyaryleneamines may contain bonds in the meta and/or ortho position.

As long as they have the repeating unit represented by the general formula (1), the polyaryleneamines of the invention may be a homo- or copolymer. Polyaryleneamines composed of at least ten repetitions of the structural unit (1) are particularly preferred since they have high resistance to heat and solvents.

Other examples of the polyaryleneamines of the invention are those that are composed of a repeating unit represented by either the following general formula (3):

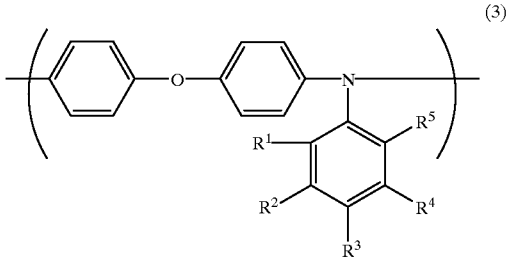

(3)

or the following general formula (7):

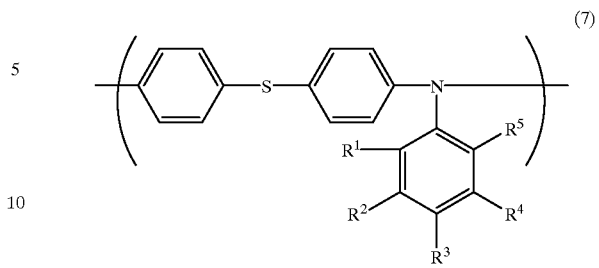

(7)

The polyaryleneamines represented by the general formula (3) are such that a diphenylether residue and an aniline derivative residue alternate in the polyaryleneamines having the structural unit represented by the general formula (1). The polyaryleneamines represented by the general formula (7) are such that a diphenyl sulfide residue and an aniline derivative residue alternate in the polyaryleneamines having the structural unit represented by the general formula (1).

Exemplary aniline derivative residues include 3-toluidine, aniline, 3-fluoroaniline, 4-fluoroaniline, 2-toluidine, 4-toluidine, 2-anisidine, 3-anisidine, 4-anisidine, 3-ethylaniline, 4-ethylaniline, 2,4-dimethoxyaniline, 2,5-dimethoxyaniline, 2,3-dimethylaniline, 2,4-dimethylaniline, 2,4,6-trimethylaniline, 4-cyanoaniline, 4-aminomethyl benzoate, 4-nitroaniline, 3,4-difluoroaniline, 3,4,5-trifluoroaniline, 2,3,4,5-tetrafluoroaniline and 2,3,4,5,6-pentafluoroaniline. Among these, the aniline, 3-toluidine and 4-fluoroaniline residues are particularly preferred since they contribute to the production of highly heat-resistant polyaryleneamines.

The polyaryleneamines of the invention that are composed of the repeating unit represented by the general formula (3) have high melting points and those having melting points higher than 245° C. are particularly useful as heat-resistant resins. The polyaryleneamines of the invention that are composed of the repeating unit represented by the general formula (7) also have high melting points and those having melting points higher than 275° C. are particularly useful as diverse heat-resisting materials.

The polyaryleneamines of the invention that are composed of the repeating unit represented by the general formula (3) or (4) may have any sufficient weight average molecular weights to be entitled to the designation of "polymers". In view of the high mechanical and other characteristics that can be provided, the polyaryleneamines have preferably weight average molecular weights of 1,000–1,000,000 as calculated for polystyrene; in view of the good processing characteristics that can be additionally provided, weight average molecular weights of 5,000–50,000 are more preferred.

The polyaryleneamines of the invention may be produced by any methods. According to one method, an arylamine represented by the following general formula (9):

(9)

(where Ar$^1$ is an aromatic group having 6–24 carbon atoms) and/or an arylenediamine derivative represented by the following general formula (10):

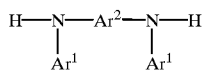

(where Ar¹ and Ar² are each independently an aromatic group having 6–24 carbon atoms) is aminated with an aryl dihalide represented by the following general formula (11):

 (11)

(where Ar² is an aromatic group having 6–24 carbon atoms; and X is Cl, Br, F or I) in the presence of both a base and a catalyst composed of a trialkylphosphine and/or an arylphosphine and a palladium compound, whereby the desired polyaryleneamine can be produced efficiently.

According to a modification of the process just described above, an aniline represented by the following general formula (12):

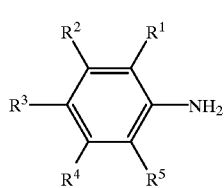 (12)

(where R¹–R⁵ are each independently a hydrogen atom, an alkyl group having 1–20 carbon atoms, a thioalkyl group having 1–20 carbon atoms, an alkoxy group having 1–20 carbon atoms, a fluorine atom, a carbonyl group, a carboxyl group, a sulfonyl group, a sulfoxyl group, a nitro group or a cyano group) is reacted with an aryl dihalide represented by the following general formula (13):

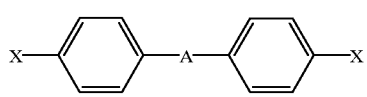 (13)

(where X is Cl, Br or I; A is O, S, SO₂, CO, CH₂ or C(CH₃)₂) to produce a polyaryleneamine composed of a repeating unit represented by the following general formula (14):

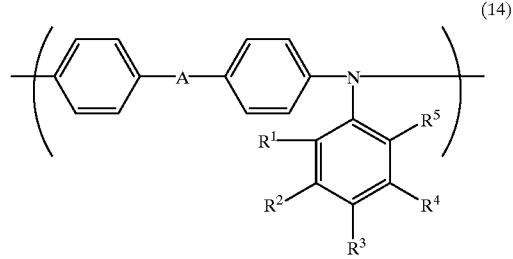 (14)

where A is O, S, SO₂, CO, CH₂ or C(CH₃)₂; R¹–R⁵ are each independently a hydrogen atom, an alkyl group having 1–20 carbon atoms, a thioalkyl group having 1–20 carbon atoms, an alkoxy group having 1–20 carbon atoms, a fluorine atom, a carboxyl group, a sulfonyl group, a sulfoxyl group, a nitro group, or a cyano group.

Specific examples of the arylamine represented by the general formula (9) which is to be used in the process described above include: anilines such as 3-toluidine, aniline, 2-fluoroaniline, 3-fluoroaniline, 4-fluoroaniline, 2-toluidine, 4-toluidine, 2-anisidine, 3-anisidine, 4-anisidine, 3-ethylaniline, 4-ethylaniline, 2,4-dimethoxyaniline, 2,5-dimethoxyaniline, 2,3-dimethylaniline, 2,4-dimethylaniline, 2,4,6-trimethylaniline, 4-cyanoaniline, 4-aminomethyl benzoate, 4-nitroaniline, 3,4-difluoroaniline, 3,4,5-trifluoroaniline, 2,3,4,5-tetrafluoroaniline and 2,3,4,5,6-pentafluoroaniline; and 2-naphthylamine, 2-aminobiphenyl, 4-aminobiphenyl, etc.

Specific examples of the arylenediamine derivative represented by the general formula (10) which is to be used in the process described above include the following: N,N'-diphenylphenylenediamine, N,N'-di(2-methoxyphenyl) phenylenediamine, N,N'-di(3-methoxyphenyl) phenylenediamine, N,N'-di(4-methoxyphenyl) phenylenediamine, N,N'-di(2-methylphenyl) phenylenediamine, N,N'-di(3-methylphenyl) phenylenediamine, N,N'-di(4-methylphenyl) phenylenediamine, N,N'-di(2-hydroxyphenyl) phenylenediamine, N,N'-di(3-hydroxyphenyl) phenylenediamine, N,N'-di(4-hydroxyphenyl) phenylenediamine, N,N'-di(2-trifluoromethylphenyl) phenylenediamine, N,N'-di(3-trifluoromethylphenyl) phenylenediamine, N,N'-di(4-trifluoromethylphenyl) phenylenediamine, N,N'-di(2,6-dimethylphenyl) phenylenediamine, N,N'-di(3,6-dimethylphenyl) phenylenediamine, N,N'-di(2,3-dimethylphenyl) phenylenediamine, N,N'-di(3,4-dimethylphenyl) phenylenediamine, N,N'-di(2,4-dimethylphenyl) phenylenediamine, N,N'-di(3-trifluoromethoxyphenyl) phenylenediamine, N,N'-di(3-trifluoromethoxyphenyl) phenylenediamine, N,N'-di(4-trifluoromethoxyphenyl) phenylenediamine, N,N'-di(3-biphenyl)phenylenediamine, N,N'-di(4-biphenyl)phenylenediamine, N,N'-di(1-naphthyl) phenylenediamine, N,N'-di(2-naphthyl)phenylenediamine, N,N'-di(3,4-methylenedioxyphenyl)phenylenediamine, N,N'-di(2-methylnaphthyl)phenylenediamine, N,N'-di(4-methylnaphthyl)phenylenediamine, N,N'-di(9-anthracenyl) phenylenediamine and N,N'-di(2-fluorenyl) phenylenediamine.

Specific examples of the aryl dihalide represented by the general formula (11) which is to be used in the process described above include: dibromobenzenes such as 1,4-dibromobenzene, 1,2-dibromobenzene, 1,3-dibromobenzene, 2,5-dibromotoluene, 3,5-dibromotoluene, 1,4-dibromo-2,5-dimethylbenzene, 1,3-dibromo-5-(trifluoromethoxy)benzene, 1,4-dibromobiphenyl, 9,10-dibromoanthracene, N-methyl-3,6-dibromocarbazole, N-ethyl-3,6-dibromocarbazole, N-propyl-3,6-dibromocarbazole, N-butyl-3,6-dibromocarbazole and 2,7-dibromofluorene; dichlorobenzenes such as 1,4-dichlorobenzene, 1,2-dichlorobenzene, 1,3-dichlorobenzene, 2,5-dichlorotoluene, 3,5-dichlorotoluene, 1,4-dichloro-2,5-dimethylbenzene, 1,3-dichloro-5-(trifluoromethoxy)benzene, 1,4-dichlorobiphenyl, 9,10-dichloroanthracene, N-methyl-3,6-dichlorocarbazole, N-ethyl-3,6-dichlorocarbazole, N-propyl-3,6-dichlorocarbazole, N-butyl-3,6-dichlorocarbazole and 2,7-dichlorofluorene; diiodebenzenes such as 1,4-diiodobenzene, 1,2-diiodobenzene, 1,3-diiodobenzene, 2,5-diiodotoluene, 3,5-diiodotoluene, 1,4-diiodo-2,5-dimethylbenzene, 1,3-diiodo-5-(trifluoromethoxy)benzene, 1,4-diiodobiphenyl, 9,10-diiodoanthracene, N-methyl-3,6-diiodocarbazole, N-ethyl-3,6-diiodocarbazole, N-propyl-3,6-diiodocarbazole, N-butyl-3,6-diiodocarbazole and 2,7- diiodofluorene; and difluorobenzenes such as 1,4-difluorobenzene, 1,2-difluorobenzene, 1,3-difluorobenzene, 2,5-difluorotoluene, 3,5-difluorotoluene, 1,4-difluoro-2,5-dimethylbenzene, 1,3-difluoro-5-(trifluoromethoxy) benzene, 1,4-difluorobiphenyl, 9,10-difluoroanthracene, N-methyl-3,6-difluorocarbazole, N-ethyl-3,6-difluorocarbazole, N-propyl-3,6-difluorocarbazole, N-butyl-3,6-difluorocarbazole and 2,7-difluorofluorene.

Other examples of the aryl dihalide represented by the general formula (11) which is to be used in the invention include the following: 4,4'-dihalogenodiphenylethers such as 4,4'-dichlorodiphenylether, 4,4'-dibromodiphenylether, 4,4'-diiododiphenylether, 4-chloro-4'-bromodiphenylether, 4-chloro-4'-iododiphenylether and 4-bromo-4'-iododiphenylether; 4,4'-dihalogenodiphenyl sulfides such as 4,4'-dichlorodiphenyl sulfide, 4,4'-dibromodiphenyl sulfide, 4,4'-diiododiphenyl sulfide, 4-chloro-4'-bromodiphenyl sulfide, 4-chloro-4'-iododiphenyl sulfide and 4-bromo-4'-iododiphenyl sulfide; 4,4'-dihalogenodiphenyl sulfones such as 4,4'-dichlorodiphenyl sulfone, 4,4'-dibromodiphenyl sulfone, 4,4'-diiododiphenyl sulfone, 4-chloro-4'-bromodiphenyl sulfone, 4-chloro-4'-iododiphenyl sulfone and 4-bromo-4'-iododiphenyl sulfone; 4,4'-dihalogenodiphenyl ketones such as 4,4'-dichlorodiphenyl ketone, 4,4'-dibromodiphenyl ketone, 4,4'-diiododiphenyl ketone, 4-chloro-4'-bromodiphenyl ketone, 4-chloro-4'-iododiphenyl ketone and 4-bromo-4'-iododiphenyl ketone; 4,4'-dihalogenodiphenylmethanes such as 4,4'-dichlorodiphenylmethane, 4,4'-dibromodiphenylmethane, 4,4'-diiododiphenylmethane, 4-chloro-4'-bromodiphenylmethane, 4-chloro-4'-iododiphenylmethane and 4-bromo-4'-iododiphenylmethane; and 2,2-di(4-halogenophenyl)propanes such as 2,2-di(4-chlorophenyl)propane, 2,2-di(4-bromophenyl)propane and 2,2-di(4-iodophenyl)propane.

The amounts of the arylenediamine derivative and/or arylamine to be added in the process of the invention are not limited to any particular values. To produce polyaryleneamines of higher molecular weights, the arylenediamine derivative is preferably added in an amount of 0.9–1.1 moles per mole of the aryl dihalide whereas the arylamine is preferably added in an amount of 0.4–0.6 moles per mole of the aryl dihalide. To the extent that will not deviate from the objects of the invention, the arylenediamine derivative and the arylamine may be used in admixture or they may be used in combination with a third component.

In the process of the invention, the amination reaction is allowed to proceed in the presence of a catalyst composed of a trialkylphosphine and/or an arylphosphine and a palladium compound. The trialkylphosphine and the arylphosphine may be used either alone or in admixture.

The palladium compound to be used in the process of the invention is not limited to any particular type and may be exemplified by the following: tetravalent palladium compounds such as sodium hexachloropalladate(IV) tetrahydrate and potassium hexachloropalladate(IV); divalent palladium compounds such as palladium(II) chloride, palladium(II) bromide, palladium(II) acetate, palladium(II) acetylacetonate, dichlorobis(benzonitrile)palladium(II), dichlorobis(acetonitrile)palladium(II), dichlorobis (triphenylphosphine)palladium(II), dichlorotetramminepalladium(II), dichloro(cycloocta-1,5-diene)palladium(II) and palladium(II) trifluoroacetate; and zero-valent palladium compounds such as tris (dibenzylideneacetone)dipalladium(O), tris (dibenzylideneacetone)dipalladium(O) chloroform complex and tetraquis(triphenylphosphine)palladium(O).

The amount in which the palladium compounds are to be used in the process of the invention is not limited in any particular way but they are typically used in amounts of 0.00001–20.0 mol %, as calculated for palladium, per mole of the halogen atoms in the starting aryl dihadide; in view of the high cost of the palladium compounds, they are preferably used in amounts of 0.001–5.0 mol %, as calculated for palladium, per mole of the halogen atoms in the starting aryl dihalide.

The trialkylphosphine to be used as a component of the catalyst in the process of the invention is not limited in any particular way and may be exemplified by triethylphosphine, tricyclohexylphosphine, triisopropylphosphine, tri-n-butylphosphine, triisobutylphosphine, tri-sec-butylphosphine and tri-tert-butylphosphine. Among these, tri-tert-butylphosphine is particularly preferred, since it exhibits high catalytic activity in the reaction.

The arylphosphine to be used in the process of the invention also is not limited in any particular way and may be exemplified by triphenylphosphine, tri(o-tolyl) phosphine, tri(m-tolyl)phosphine, tri(p-tolyl)phosphine, BINAP, trimesitylphoshine, diphenylphosphinoethane, diphenylphosphinopropane and diphenylphosphinoferrocene.

The amounts in which the trialkylphosphine and/or arylphosphine are to be used in the process of the invention are not limited to any particular values and they may typically be used in the range of 0.01–10,000 moles per mole of the palladium compound. In view of the high cost of the trialkylphosphine and arylphosphine, they are preferably used in the range of 0.1–10 moles per mole of the palladium compound.

The catalyst to be used in the process of the invention consists of the palladium compound and the trialkylphosphine and/or arylphosphine. The two catalytic components may be added independently to the reaction system; alternatively, a complex of the two components may first be prepared and then added to the reaction system.

The base to be used in the process of the invention also is not limited in any particular way and may be exemplified by inorganic bases such as sodium or potassium carbonates and alkali metal alkoxides, and organic bases such as tertiary amines. Among these, alkali metal alkoxides are preferred as exemplified by sodium methoxide, sodium ethoxide, potassium methoxide, potassium ethoxide, lithium-tert-butoxide, sodium-tert-butoxide and potassium-tert-butoxide. These may be added as such to the reaction system or, alternatively, they may be added to the reaction system after in situ preparation from an alkali metal or an alkali metal hydride and an alcohol.

The amount in which the base is to be used in the process of the invention is not limited to any particular value but it is preferably used in at least one half of a mole per mole of the halogen atoms in the aryl dihalide to be added to the reaction system; in view of the ease in performing post-treatments after the end of the reaction, it is particularly preferred to use the base in an amount ranging from 1.0 to 5 moles per mole of the halogen atoms in the aryl dihalide.

The process of the invention is generally performed in an inert solvent. Any inert solvents that do not very much interfere with the intended reaction may be used without any particular limitations and examples include: aromatic hydrocarbon solvents such as benzene, toluene and xylene; ether solvents such as diethyl ether, tetrahydrofuran and dioxane; and acetonitrile, dimethylformamide, dimethyl sulfoxide and hexamethyl phosphoric triamide. Among these, aromatic hydrocarbon solvents such as benzene, toluene and xylene are particularly preferred.

The process of the invention is preferably performed in an inert gas atmosphere such as nitrogen or argon at atmospheric pressure. It should, however, be noted that the process can also be performed under superatmospheric pressure.

Any reaction conditions that are capable of producing the desired polyaryleneamines may be employed in the process of the invention without any particular limitations; to give just one example, the reaction temperature ranges preferably from 20 to 300° C., more preferably from 50 to 200° C., and the reaction time may range from several minutes to 72 hours.

When the aniline represented by the general formula (12) and the aryl dihalide represented by the general formula (13) are reacted to produce a polyaryleneamine composed of the repeating unit represented by the general formula (14), the reaction temperature may preferably be selected from the range of 20–250° C., more preferably from the range of 50–150° C., with the reaction time being selected from the range of several minutes to 20 hours.

The polyaryleneamine of the invention is composed of the repeating unit represented by the general formula (1) and in its structure, the aryl residue and the aniline derivative residue alternate to provide a higher melting point and improved heat resistance. Therefore, the polyaryleneamine of the invention is salient as a heat-resisting structural material.

The polyaryleneamine of the invention may be used independently as a resin material; if desired, it may be used in admixture with fillers such as glass fiber, carbon fiber, talc, calcium carbonate and mica, or various types of stabilizers including antioxidants and photostabilizers. The polyaryleneamine of the invention may also be used as a polymer alloy or blend with other polymers including general-purpose resins such as polyethylene, poly(vinyl chloride) and polystyrene, engineering plastics such as polypropylene and modified polyphenylene ether, and super engineering plastics such as polyphenylene sulfide, polyphenylene sulfide ketone, polyimides, polyether imides and liquid-crystal polymers. The polymer of the invention comprises a series of triarylamine structures capable of efficient positive hole transport and, hence, it holds promise for use as a positive hole transport material in organic electroluminescent (EL) devices.

The following examples are provided for the purpose of further illustrating the present invention but are in no way intended to limit its scope.

EXAMPLE 1

A four-necked flask (200 mL) equipped with a condenser tube and a thermometer was charged with 2.6 g (0.01 mol) of N,N'-diphenylphenylenediamine, 2.36 g (0.01 mol) of p-dibromobenzene, 2.69 g (1.4 eqs. as compared to bromine atoms) of sodium tertiary butoxide and 60 mL of o-xylene at room temperature. To the mixture, 11.2 mg (0.5 mol %) of palladium acetate and 4 eqs. as compared to palladium compound of tritertiary butylphosphine were added in a nitrogen atmosphere. Subsequently, the mixture was heated to 120° C. in a nitrogen atmosphere and reaction was performed at 120° C. for 3 h.

After the end of the reaction, 60 mL of water was added to wash the reaction product, from which the solids was recovered by filtration. The recovered solids was washed again with 20 mL of water and subsequently dried under vacuum to give a yellow powder in an amount of 4.03 g (yield: 92.8%).

TG/DTA showed that the powder had a melting point of 325.6° C. The powder was also subjected to elementary and IR analyses and the results are respectively shown in Table 1 and FIG. 1.

TABLE 1

|  | C | H | N |
|---|---|---|---|
| Found (wt %) | 86.19 | 5.37 | 8.44 |
| Cal'd (wt %) | 86.23 | 5.39 | 8.38 |

With all data taken together, the powder was a polyaryleneamine having high melting point.

EXAMPLE 2

A four-necked flask (200 mL) equipped with a condenser tube and a thermometer was charged with 2.14 g (0.02 mol) of 3-toluidine, 9.44 g (0.04 mol) of p-dibromobenzene, 10.75 g (1.4 eqs. as compared to bromine atoms) of sodium tertiary butoxide and 60 mL of o-xylene at room temperature. To the mixture, 51.8 mg (0.25 mol %) of a tris (dibenzylideneacetone)dipalladium chloroform complex (product of Aldrich) and 4 eqs. as compared to palladium compound of tri-tertiary butylphosphine were added in a nitrogen atmosphere. Subsequently, the mixture was heated to 120° C. in a nitrogen atmosphere and reaction was performed at 120° C. for 3 h.

After the end of the reaction, 60 mL of water was added to wash the reaction product, from which the solids was recovered by filtration. The recovered solids was washed again with 20 mL of water and subsequently dried under vacuum to give a yellow powder in an amount of 3.75 g (yield: 89.4%).

Figure 2:
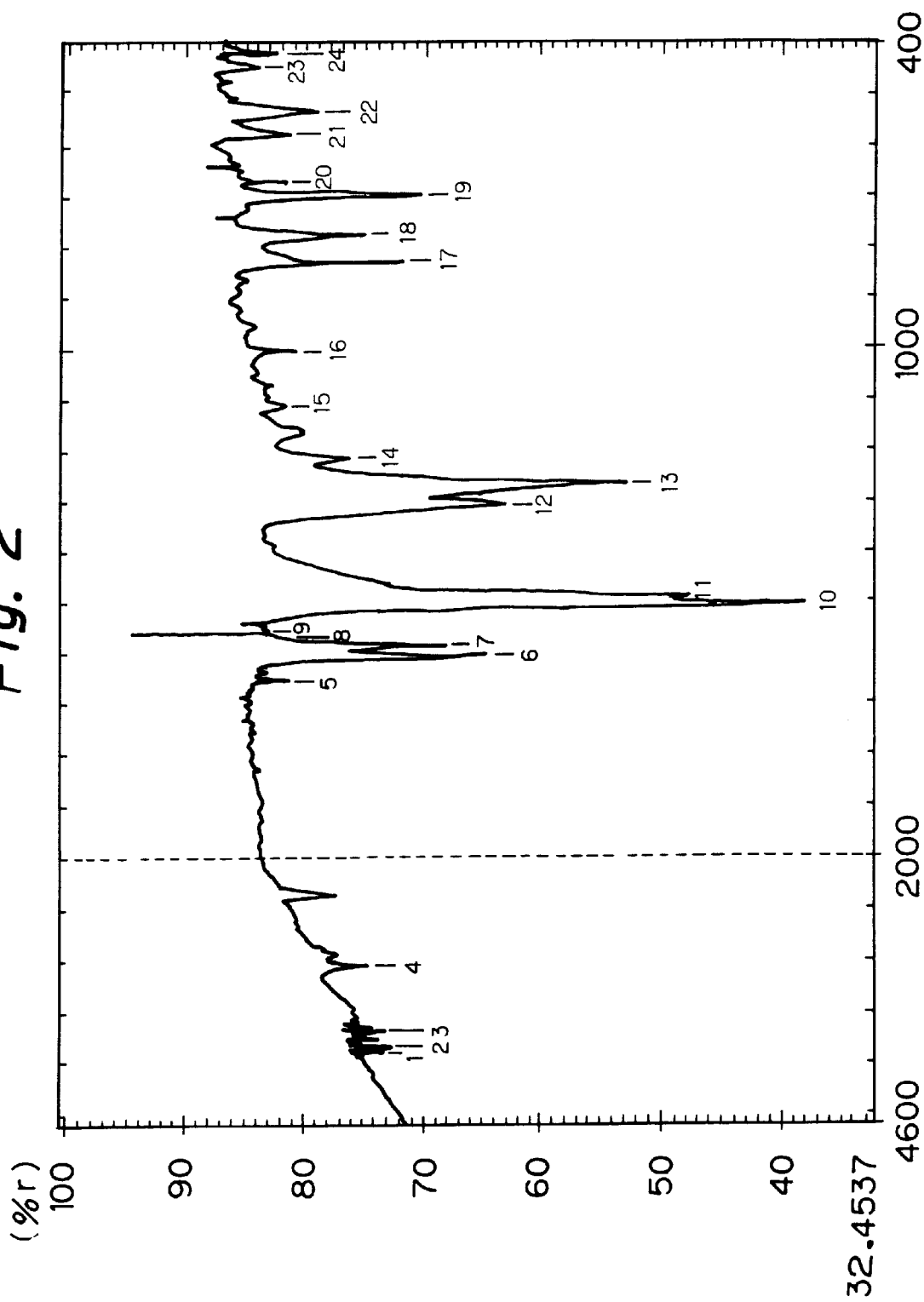
FIG. 2 is an IR chart for the polyaryleneamine prepared in Example 2.

TG/DTA showed that the powder had a melting point of 327.6° C. The powder was also subjected to elementary and IR analyses and the results are respectively shown in Table 2 and FIG. 2.

TABLE 2

|  | C | H | N |
|---|---|---|---|
| Found (wt %) | 86.15 | 6.05 | 7.80 |
| Cal'd (wt %) | 86.19 | 6.08 | 7.73 |

With all data taken together, the powder was a polyaryleneamine having high melting point.

EXAMPLE 3

Reaction and post-treatments were performed under the same conditions as in Example 2, except that the amount of p-dibromobenzene was reduced from 9.44 g (0.04 mol) to 4.72 g (0.02 mol) and sodium tert-butoxide was reduced from 10.75 g to 5.38 g (1.4 eqs. as compared to bromine atoms). Upon vacuum drying, a yellow white powder formed in an amount of 3.41 g (yield: 94.2%).

Figure 3:
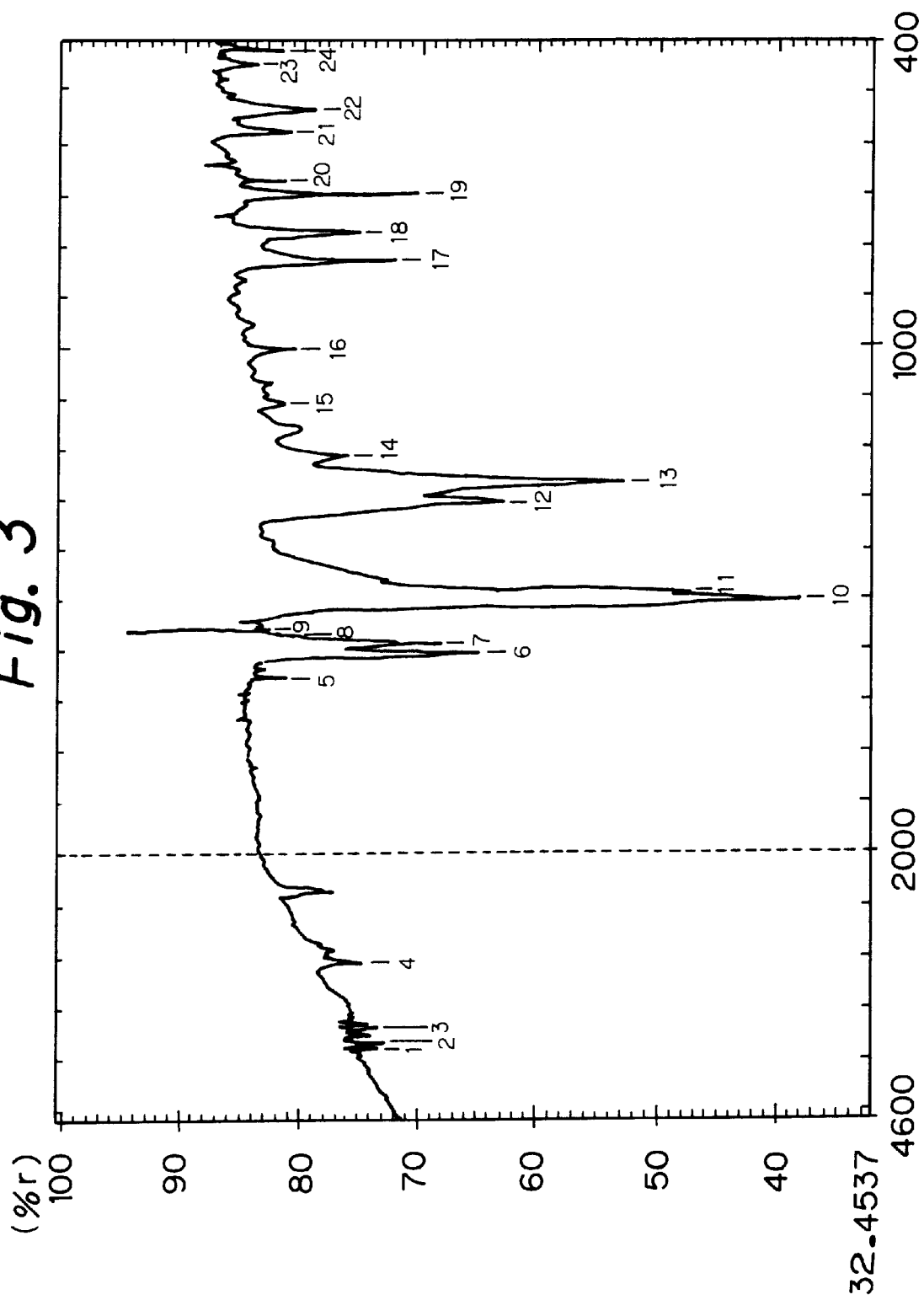
FIG. 3 is an IR chart for the polyaryleneamine prepared in Example 3.

TG/DTA showed that the powder had a melting point of 327.6° C. The powder was also subjected to elementary and IR analyses and the results are respectively shown in Table 3 and FIG. 3.

TABLE 3

|  | C | H | N |
|---|---|---|---|
| Found (wt %) | 86.19 | 6.08 | 7.73 |
| Cal'd (wt %) | 86.14 | 6.14 | 7.72 |

EXAMPLE 4

Reaction and post-treatments were performed under the same conditions as in Example 3, except that 2.14 g (0.02 mol) of 3-toluidine was replaced by 2.22 g (0.02 mol) of 4-fluoroaniline. Upon vacuum drying, a yellow white powder formed in an amount of 3.60 g (yield: 97.3%).

Figure 4:
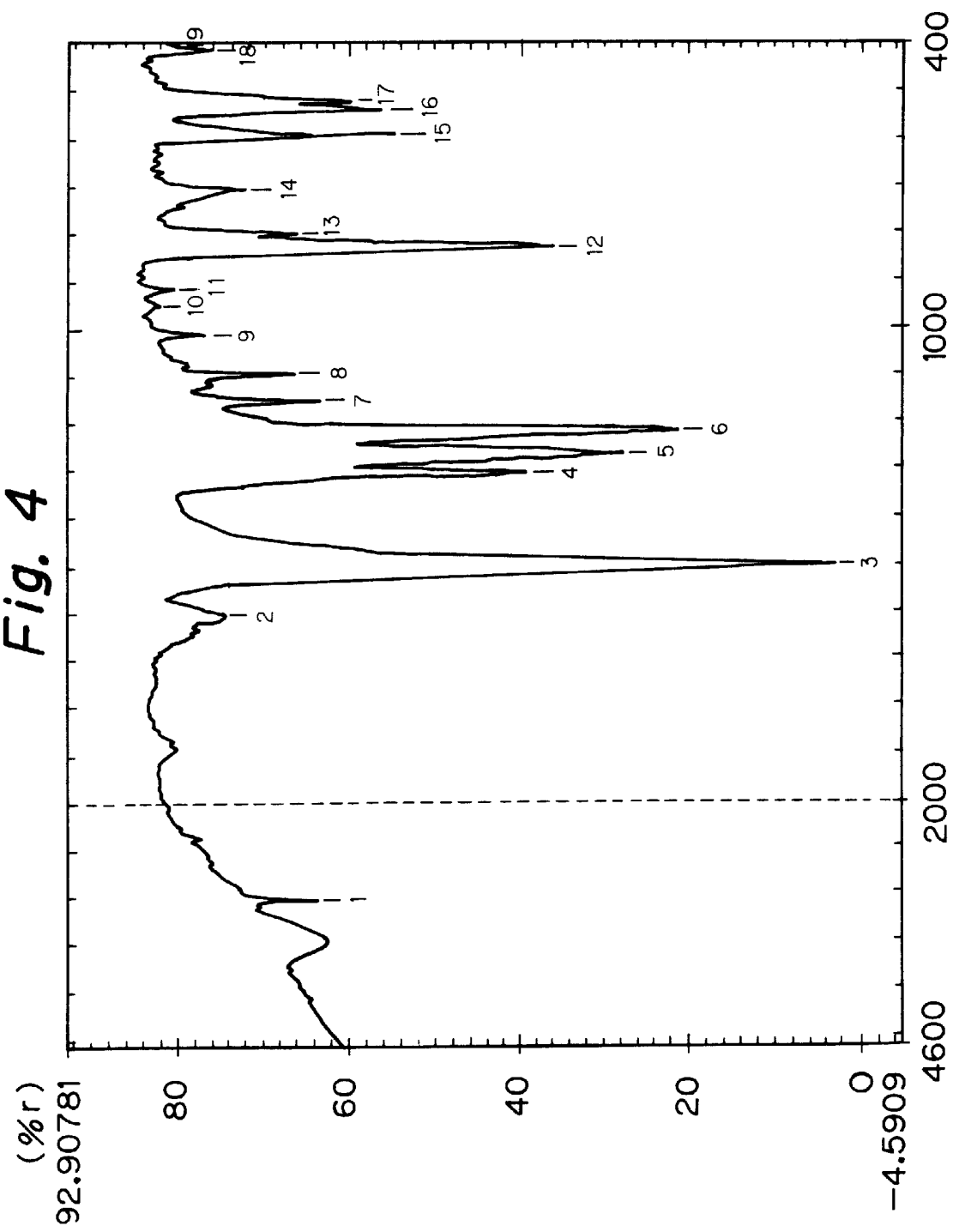
FIG. 4 is an IR chart for the polyaryleneamine prepared in Example 4.

TG/DTA showed that the powder had a melting point of 331.3° C. The powder was also subjected to elementary and IR analyses and the results are respectively shown in Table 4 and FIG. 4.

TABLE 4

|  | C | H | N | F |
|---|---|---|---|---|
| Cal'd (wt %) | 77.84 | 4.32 | 7.57 | 10.27 |
| Found (wt %) | 77.78 | 4.49 | 7.52 | 10.21 |

EXAMPLE 5

Reaction and post treatments were performed under the same conditions as in Example 3, except that 4.72 g of p-dibromobenzene was replaced by 6.24 g of 4,4'-dibromobiphenyl. Upon vacuum drying, a yellow white powder formed in an amount of 5.10 g (yield: 99.0%).

Figure 5:
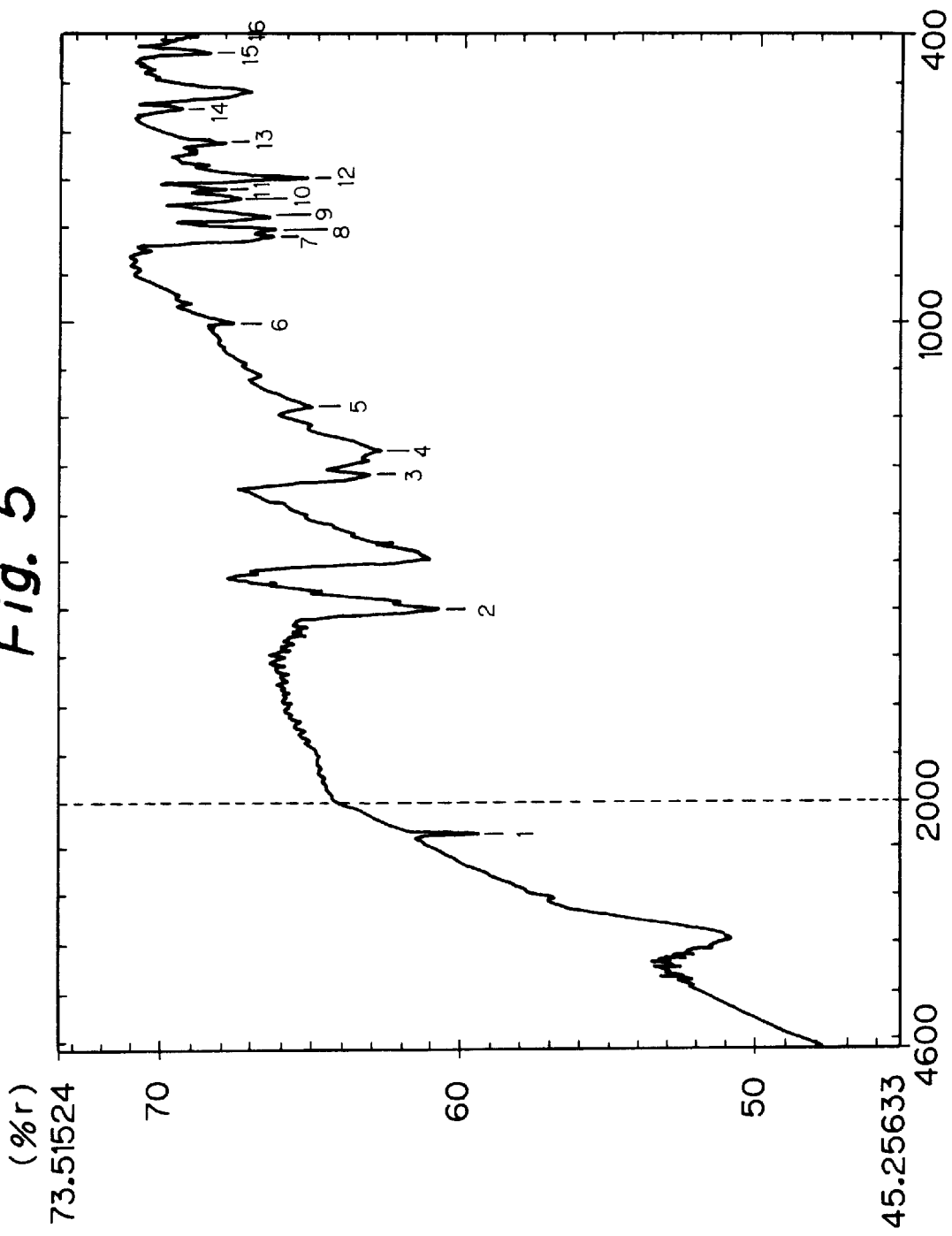
FIG. 5 is an IR chart for the polyaryleneamine prepared in Example 5.

TG/DTA showed that the powder had a melting point of 268.0° C. The powder was also subjected to elementary and IR analyses and the results are respectively shown in Table 5 and FIG. 5.

TABLE 5

|  | C | H | N |
|---|---|---|---|
| Cal'd (wt %) | 88.72 | 5.84 | 5.44 |
| Found (wt %) | 88.60 | 5.97 | 5.43 |

EXAMPLE 6

Reaction and post treatments were performed under the same conditions as in Example 3, except that 4.72 g (0.02 mol) of p-dibromobenzene was replaced by an equal amount of m-dibromobenzene. Upon vacuum drying, a yellow white powder formed in an amount of 3.35 g (yield: 92.5%).

Figure 6:
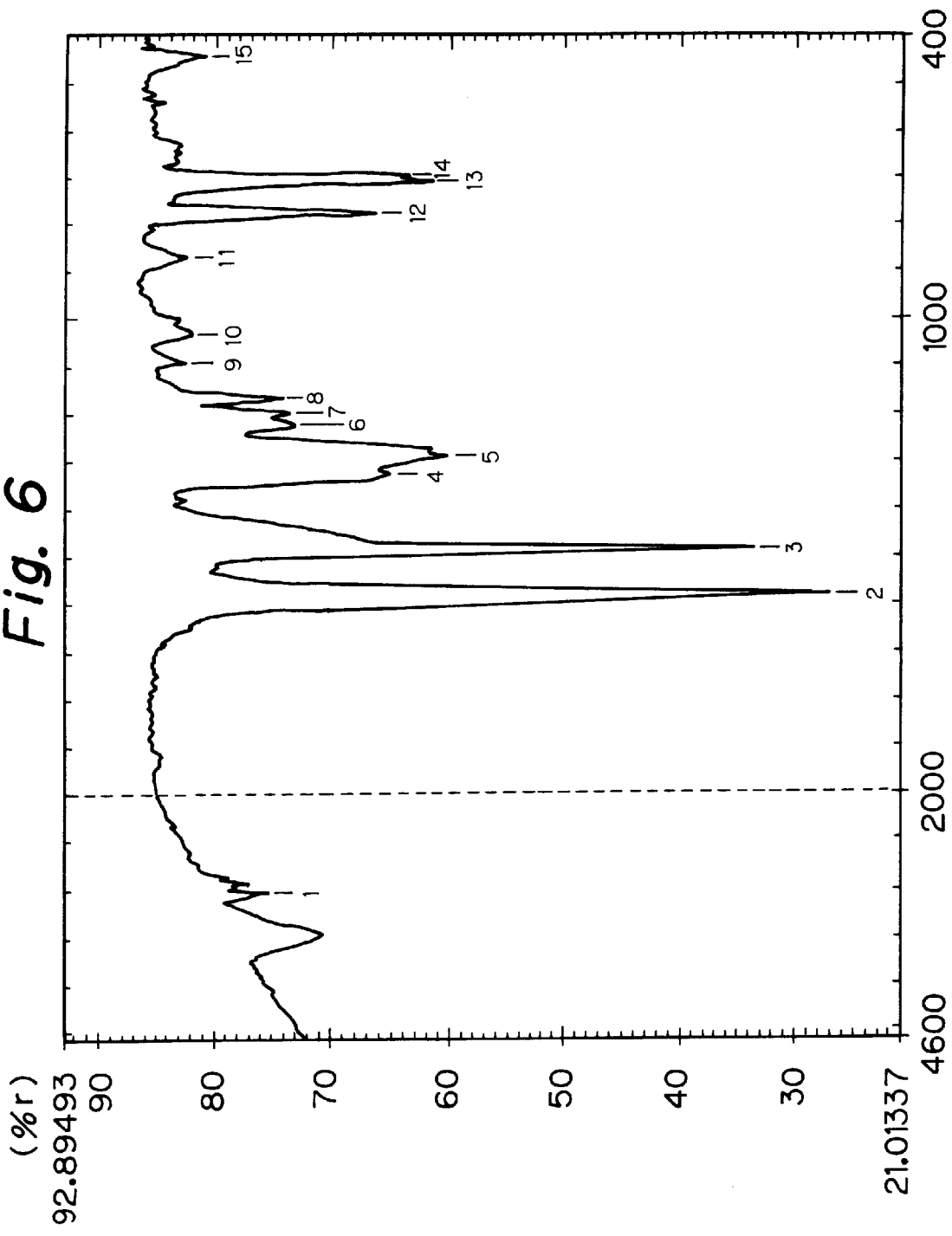
FIG. 6 is an IR chart for the polyaryleneamine prepared in Example 6.

TG/DTA showed that the powder had a melting point of 281.2° C. The powder was also subjected to elementary and IR analyses and the results are respectively shown in Table 6 and FIG. 6.

TABLE 6

|  | C | H | N |
|---|---|---|---|
| Cal'd (wt %) | 86.19 | 6.08 | 7.73 |
| Found (wt %) | 86.15 | 6.14 | 7.74 |

EXAMPLE 7

Reaction and post treatments were performed under the same conditions as in Example 3, except that the amount of the poalladium catalyst was increased from 0.25 mol % to 2.5 mol % (518 mg) and that tri-ortho-tolylphosphine rather than tri-tertiary butylphosphine was used in an amount of 4 eqs. as compared to the palladium catalyst. Upon vacuum drying, a yellow white powder formed in an amount of 2.72 g (yield: 75.1%).

EXAMPLE 8

Reaction and post treatments were performed under the same conditions as in Example 3, except that the amount of the palladium catalyst was increased from 0.25 mol % to 0.5 mol % (103.6 mg) and sodium tert-butoxide was reduced from 10.75 g to 5.38 g (1.4 eqs. as compared to bromine atoms) and that tricyclohexylphosphine rather than tri-tertiary butylphosphine was used in an amount of 4 eqs. as compared to the palladium catalyst. Upon vacuum drying, a yellow white powder formed in an amount of 2.94 g (yield: 81.2%).

EXAMPLE 9

A four-necked flask (200 mL) equipped with a condenser tube and a thermometer was charged with 2.14 g (0.02 mol) of 3-toluidine, 6.56 g (0.02 mol) of 4,4'-dibromodiphenylether, 4.61 g (1.2 eqs. as compared to bromine atoms) and 80 mL of o-xylene at room temperature. To the mixture, 103.5 mg (0.5 mol %) of tris(dibenzylideneacetone)dipalladium and 4 eqs. as compared to palladium compound of tri-tertiary butylphosphine were added in a nitrogen atmosphere. Subsequently, the mixture was heated to 120° C. in a nitrogen atmosphere and reaction was performed at 120° C. for 3 h with stirring. After the end of the reaction, 60 mL of water was added to wash the reaction product, which was separated into oil and water phases in a separating funnel and the organic phase was concentrated under vacuum to give a solution in orange color. The solution was added dropwise to a 1:5 mixture of THF and methanol, whereupon a white powder precipitated. The white powder was recovered by filtration and dried under vacuum to give a white powder in an amount of 4.20 g (yield: 73.0%). The polymer had a melting point of 249.4° C. (as measured with TG/DTA 220 of Seiko Instruments, Inc.)

Figure 7:
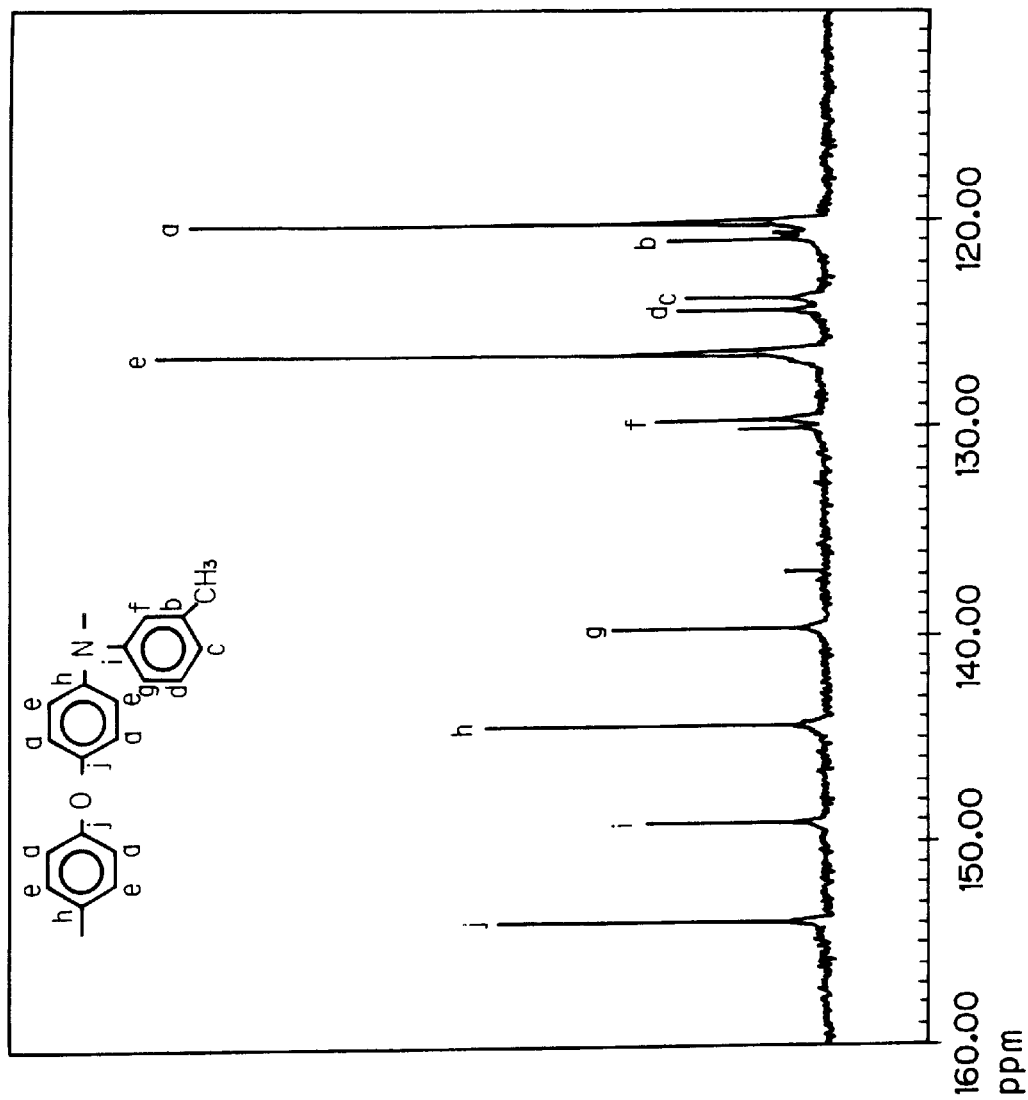
FIG. 7 is an NMR chart for the polyaryleneamine prepared in Example 9.
Figure 8:
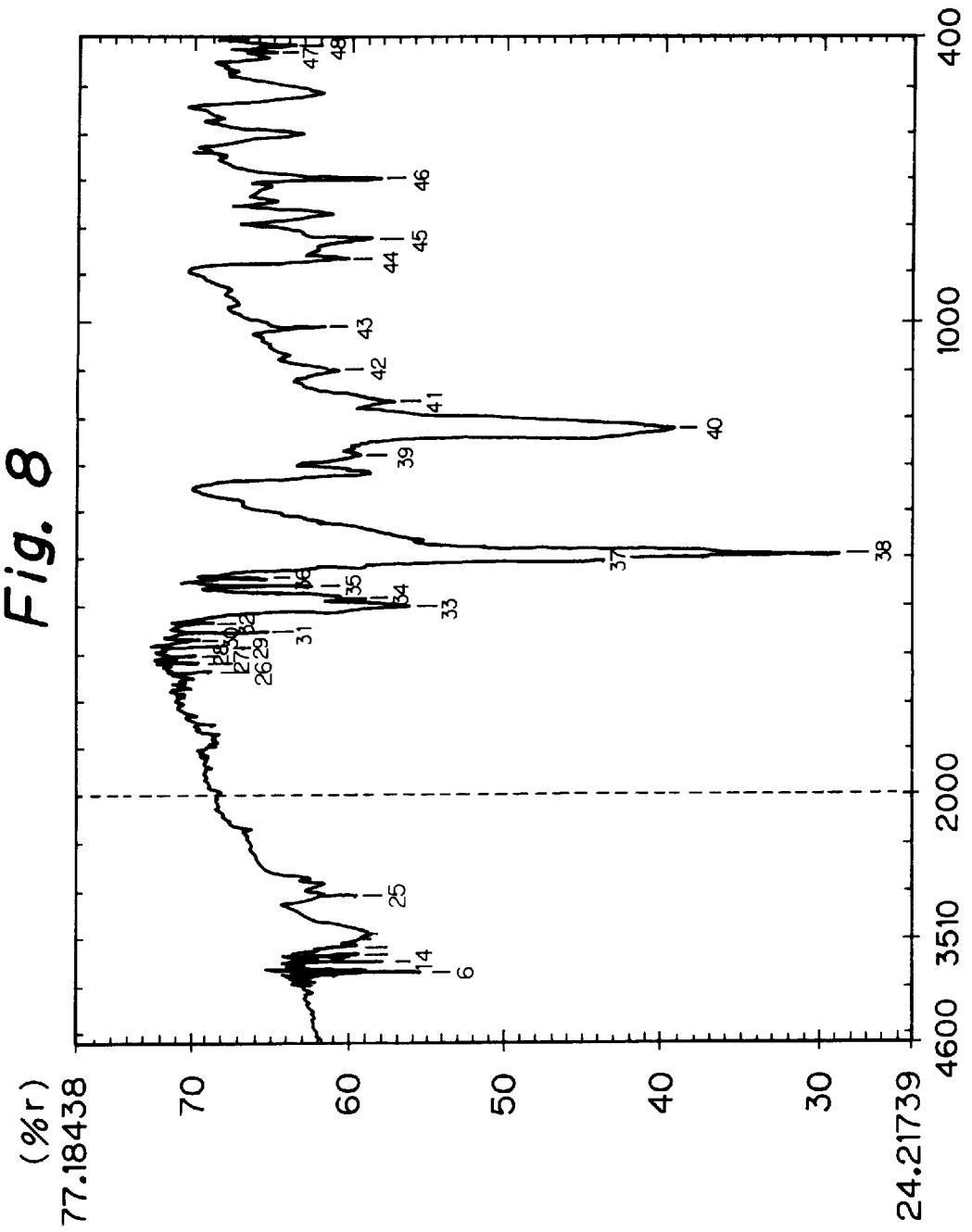
FIG. 8 is an IR chart for the polyaryleneamine prepared in Example 9.

GPC analysis using THF as an eluant (with HLC 8120 of TOSOH CORP.) showed that the polyaryleneamine had an average molecular weight of 19,600 as calculated for polystyrene. The polyaryleneamine was subjected to NMR analysis (with GSX-400 of JEOL LTD.), IR analysis (with DR-8000 of Shimadzu Corp.) and elementary analysis (with CHN CORDER MT-5 of Yanaco); the results of the respective analyses are shown in FIGS. 7 and 8 and Table 7.

TABLE 7

|  | C | H | N | O |
|---|---|---|---|---|
| Found (wt %) | 83.4 | 5.6 | 5.3 | 5.7 |
| Cal'd (wt %) | 83.5 | 5.5 | 5.1 | 5.9 |

EXAMPLE 10

A four-necked flask (200 mL) equipped with a condenser tube and a thermometer was charged with 2.22 g (0.02 mol) of 4-fluoroaniline, 6.56 g (0.02 mol) of 4,4'-dibromodiphenylether, 4.61 g (1.2 eqs. as compared to bromine atoms) of sodium tertiary butoxide and 80 mL of o-xylene at room temperature. To the mixture, 103.5 mg (0.5 mol %) of tris(dibenzylideneactone)depalladium and 4 eqs. as compared to palladium compound of tri-tertiary butylphosphone were added in a nitrogen atmosphere. Subsequently, the mixture was heated to 120° C. in a nitrogen atmosphere and reaction was performed at 120° C. for 3 h with stirring. After the end of the reaction 60 mL of water was added to wash the reaction product, which was separated into oil and water phases in a separating funnel and the organic phase was concentrated under vacuum to give a solution in orange color. The solution was added dropwise to a 1:5 mixture of THF and methanol, whereupon a white powder precipitated. The white powder was recovered by filtration and dried under vacuum to give a white powder in an amount of 4.45 g (yield: 97.3%). The polymer had a melting point of 252.9° C. (as measured with TG/DTA 220 of Seiko Instruments, Inc.)

Figure 9:
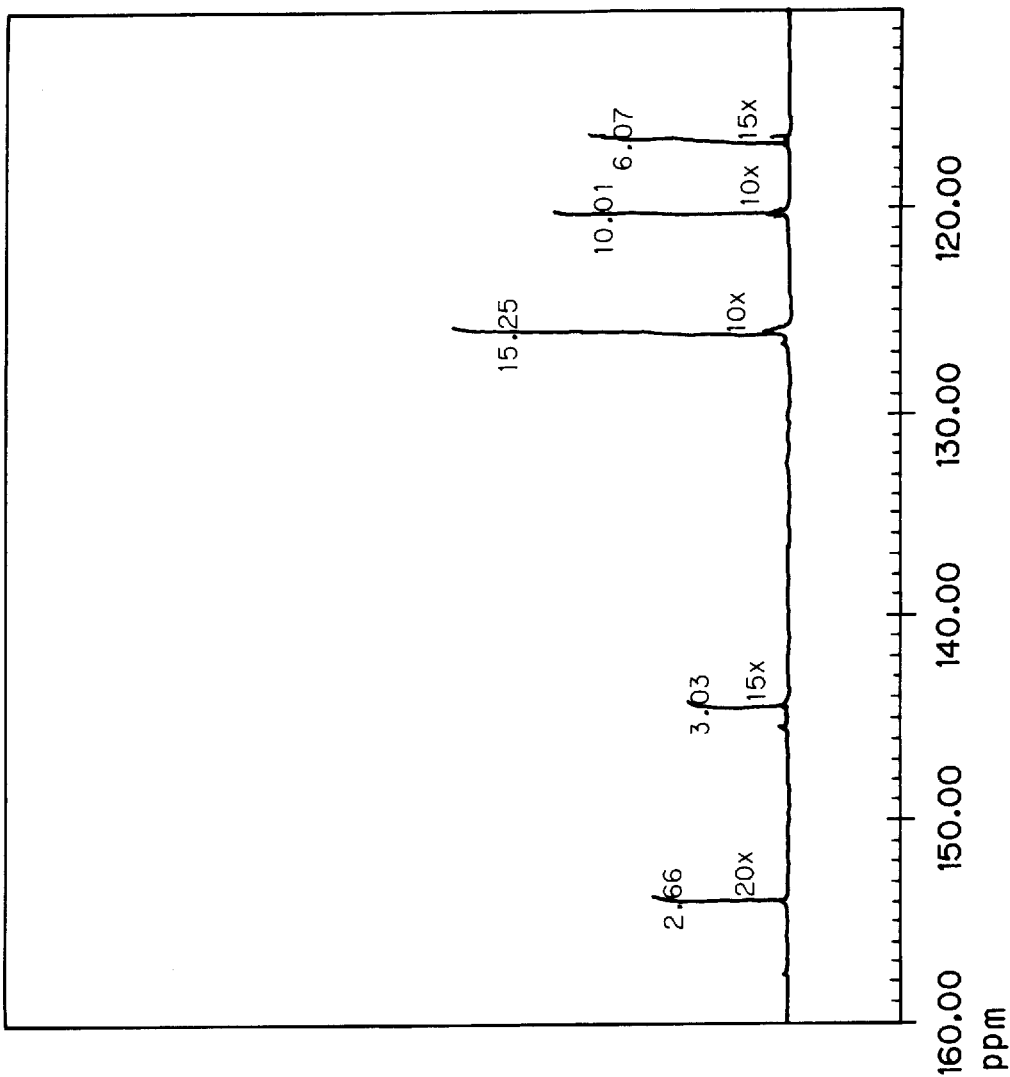
FIG. 9 is an NMR chart for the polyaryleneamine prepared in Example 10.
Figure 10:
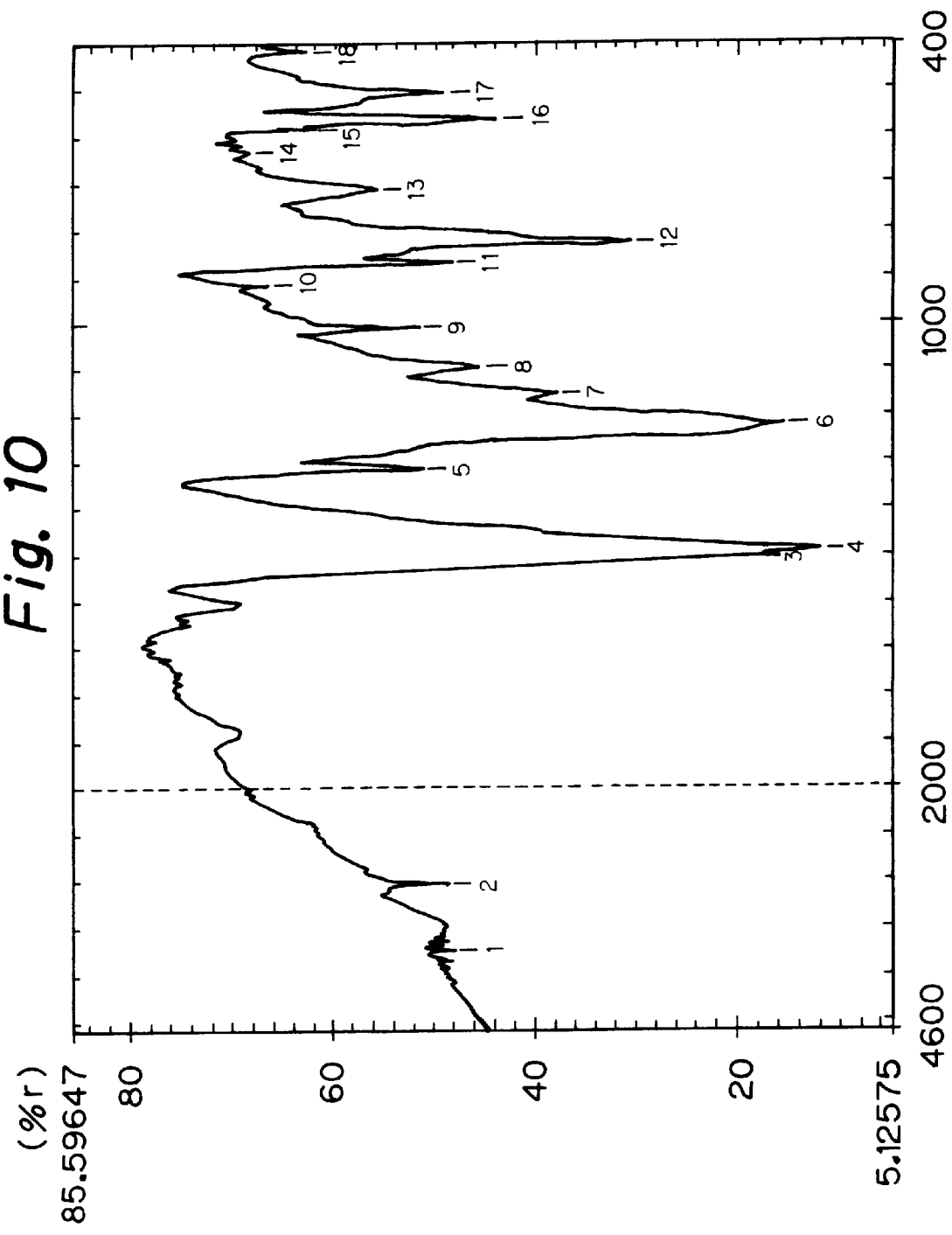
FIG. 10 is an IR chart for the polyaryleneamine prepared in Example 10.

GPC analysis using THF as an eluant (with HLC 8120 of TOSOH CORP.) showed that the polyaryleneamine had an average molecular weight of 19,800 as calculated for polystyrene. The polyaryleneamine was subjected to NMR analysis (with JNM-SX270 of JEOL LTD.), IR analysis (with DR-8000 of Shimadzu Corp.) and elementary analysis (with CHN CORDER MT-5 of Yanaco); the results of the respective analyses are shown in FIGS. 9 and 10 and Table 8.

TABLE 8

|  | C | H | N | O, F |
|---|---|---|---|---|
| Found (wt %) | 77.49 | 4.30 | 4.99 | 13.22 |
| Cal'd (wt %) | 77.98 | 4.33 | 5.05 | 12.64 |

EXAMPLE 11

A four-necked flask (200 mL) equipped with a condenser tube and a thermometer was charged with 1.86 g (0.02 mol) of aniline, 6.56 g (0.02 mol) of 4,4'-dibromodiphenylether, 4.61 g (1.2 eqs. as compared to bromine atoms) of sodium tertiary butoxide and 80 mL of o-xylene at room temperature. To the mixture, 103.5 mg (0.5 mol %) of tris (dibenzylideneacetone)dipalladium and 4 eqs. as compared to palladium compound of tri-tertiary butylphosphine were added in a nitrogen atmosphere. Subsequently, the mixture was heated to 120° C. in a nitrogen atmosphere and reaction was performed at 120° C. for 3 h with stirring. After the end of the reaction, 60 mL of water was added to wash the reaction product, from which the solids was recovered by filtration. The recovered solids was washed with 30 mL each of water, THF and methanol. Subsequent vacuum drying gave a white powder in an amount of 4.05 g (yield: 78.2%). The polymer had a melting point of 259.4° C. (as measured with TG/DTA 220 of Seiko Instruments, Inc.)

Figure 11:
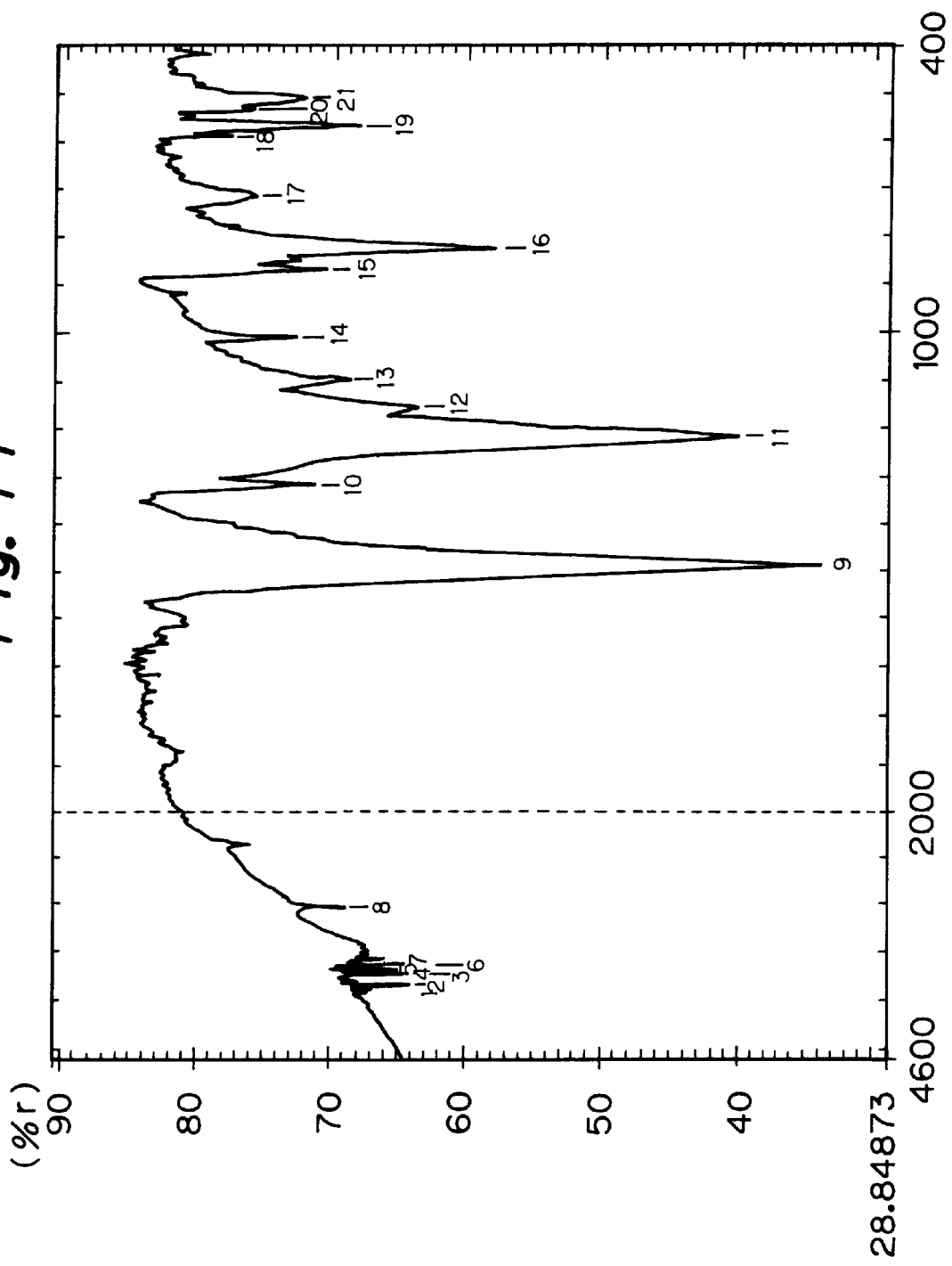
FIG. 11 is an IR chart for the polyaryleneamine prepared in Example 11.

The polymer was also subjected to IR analysis (with DR-8000 of Shimadzu Corp.) and elementary analysis (with CHN CORDER MT-5 of Yanaco); the results are respectively shown in FIG. 11 and Table 9.

TABLE 9

|  | C | H | N | O |
|---|---|---|---|---|
| Found (wt %) | 83.38 | 5.00 | 5.38 | 6.24 |
| Cal'd (wt %) | 83.40 | 5.02 | 5.40 | 6.18 |

EXAMPLE 12

A four-necked flask (200 mL) equipped with a condenser tube and a thermometer was charged with 2.14 g (0.02 mol) of 3-toluidine, 6.88 g (0.02 mol) of 4,4'-dibromodiphenyl sulfide, 4.61 g (1.2 eqs. as compared to bromine atoms) of sodium tertiary butoxide and 80 mL of o-xylene. In a separate step, a complex was formed from 103.5 mg (0.5 mol %) of tris(dibenzylideneacetone)dipalladium and 4 eqs. as compared to palladium compound of tri-tertiary butylphosphine. The thus prepared complex was used as a catalyst and its solution in o-xylene was added to the mixture in the flask through a syringe in a nitrogen atmosphere.

Subsequently, the flask was heated to 120° C. in a nitrogen atmosphere and reaction was performed at 120° C. for 3 h with stirring. After the end of the reaction, 60 mL of water was added to wash the reaction product, from which the solids was recovered by filtration. The recovered solids was washed with 30 mL each of water, THF and methanol. Subsequent vacuum drying gave a white powder in an amount of 5.22 g (yield: 93.1%). The polymer had a melting point of 275.5° C. (as measured with TG/DTA 220 of Seiko Instruments, Inc.)

Figure 12:
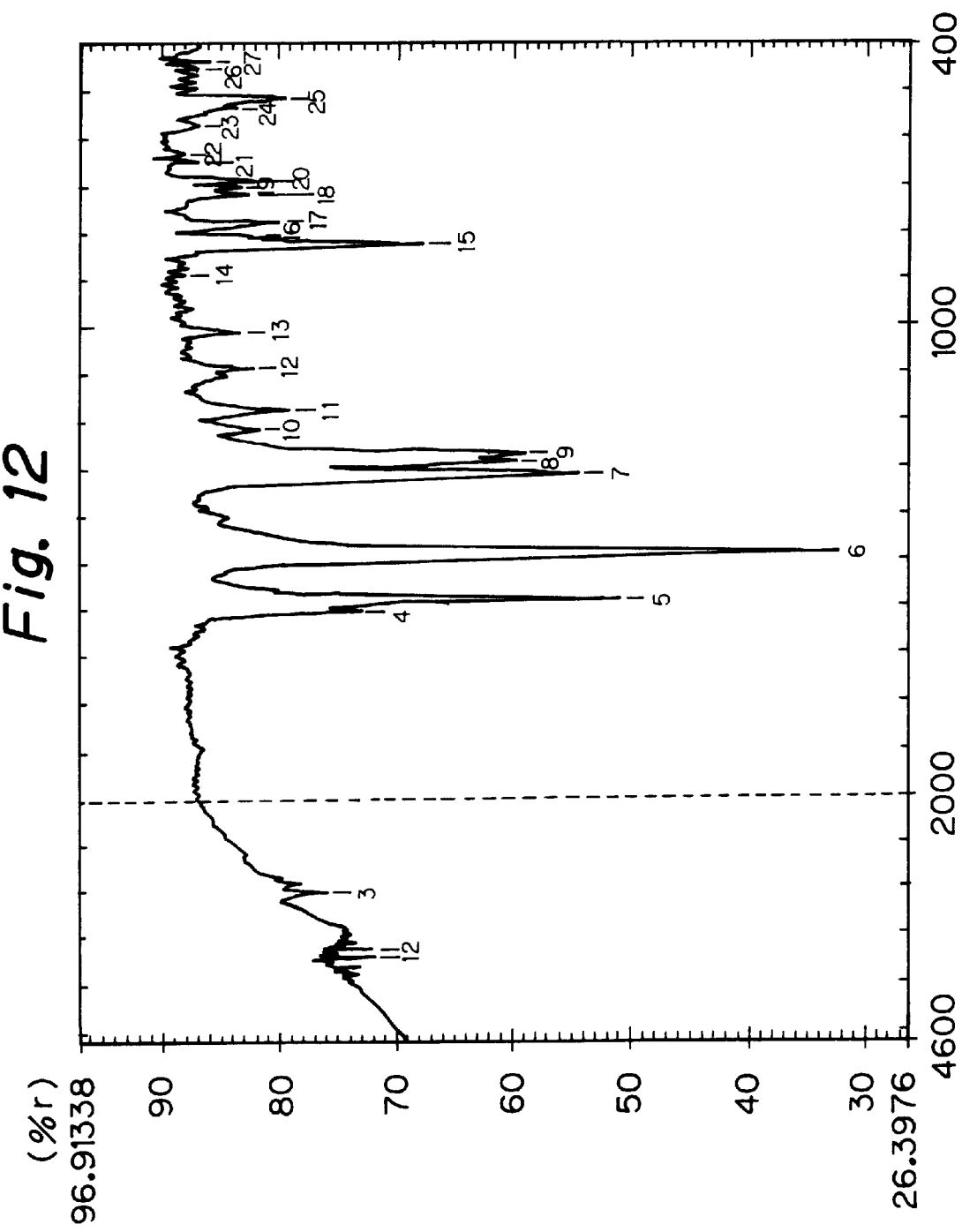
FIG. 12 is an IR chart for the polyaryleneamine prepared in Example 12.

The resulting polyaryleneamine was subjected to elementary analysis (with CHN CORDER MT-5 of Yanaco) and IR analysis (with DR-8000 of Shimadzu Corp.); the results of the respective analyses are shown in Table 10 and FIG. 12.

TABLE 10

|  | C | H | N | S |
|---|---|---|---|---|
| Found (wt %) | 78.80 | 4.99 | 4.89 | 11.28 |
| Cal'd (wt %) | 78.89 | 5.19 | 4.84 | 11.08 |

As will be understood from the foregoing description, the present invention provides novel polyaryleneamines that have tertiary arylamino groups connected serially and which are useful as structural materials improved in heat resistance, solvent resistance and other properties. The invention also provides a process for efficient production of the polyaryleneamines. Therefore, the invention will offer great benefits to the industry concerned.

What is claimed is:

1. A polyaryleneamine having a structural unit represented by the following general formula (1):

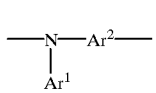

(1)

where $Ar^1$ and $Ar^2$ are each independently an aromatic group having 6–24 carbon atoms.

2. The polyaryleneamine according to claim 1, wherein $Ar^1$ in the general formula (1) is a substituted or unsubstituted phenyl, biphenyl, anthracenyl, naphthyl or fluorenyl group, and $Ar^2$ in the general formula (1) is a divalent group corresponding to any one of the above-listed substituted or unsubstituted monovalent groups.

3. The polyaryleneamine according to claim 1 or 2, which has a structural unit represented by the following general formula (2):

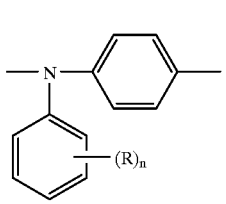

(2)

where R is H or $CH_3$ and n is an integer of 1–5.

4. The polyaryleneamine according to claim 1, which is composed of a repeating unit represented by the following general formula (3):

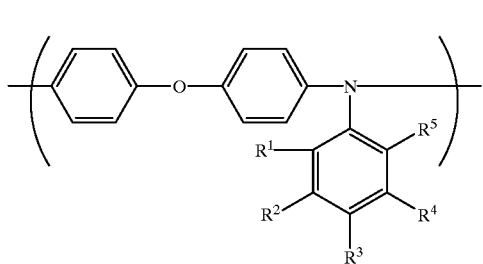

(3)

where $R^1$–$R^5$ are each independently a hydrogen atom, an alkyl group having 1–20 carbon atoms, a thioalkyl group having 1–20 carbon atoms, an alkoxy group having 1–20 carbon atoms, a fluorine atom, a carbonyl group, a carboxyl group, a sulfonyl group, a sulfoxyl group, a nitro group or a cyano group.

5. The polyaryleneamine according to claim 4, which is composed of a repeating unit represented by the following general formula (4):

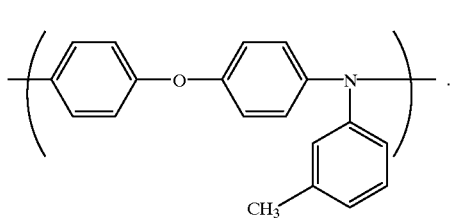

(4)

6. The polyaryleneamine according to claim 4, which is composed of a repeating unit represented by the following general formula (5):

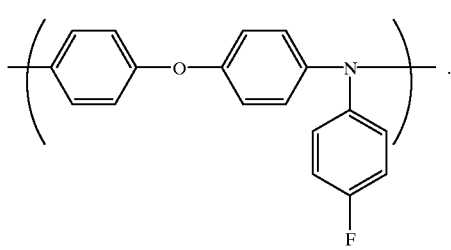

(5)

7. The polyaryleneamine according to claim 4, which is composed of a repeating unit represented by the following general formula (6):

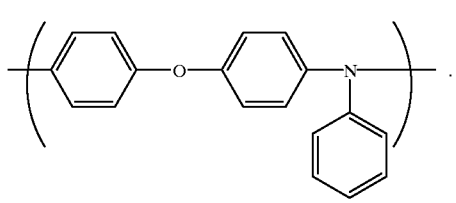

(6)

8. The polyaryleneamine according to claim 1, which is composed of a repeating unit represented by the following general formula (7):

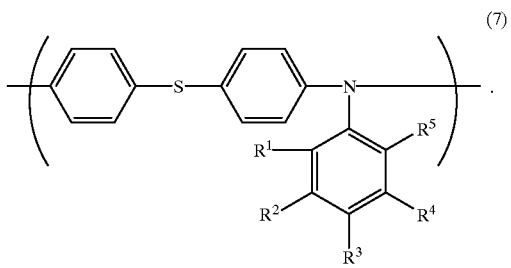

(7)

where $R^1$–$R^5$ are each independently a hydrogen atom, an alkyl group having 1–20 carbon atoms, a thioalkyl group having 1–20 carbon atoms, an alkoxy group having 1–20 carbon atoms, a fluorine atom, a carbonyl group, a carboxyl group, a sulfonxyl group, a sulfoxyl group, a nitro group or a cyano group.

9. The polyaryleneamine according to claim 8, which is composed of a repeating unit represented by the following general formula (8):

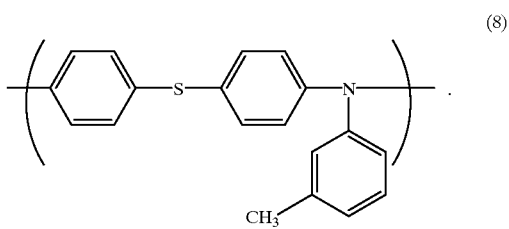

(8)

10. The polyaryleneamine according to any one of claims 4–9, which has a weight average molecular weight between 1,000 and 1,000,000 as calculated for polystyrene.

11. The polyaryleneamine according to any one of claims 4–9, which has a weight average molecular weight between 5,000 and 50,000 as calculated for polystyrene.

12. A process for producing the polyaryleneamine according to any one of claims 1 or 2, which comprises aminating an arylamine represented by the following general formula (9):

$$Ar^1-NH_2 \qquad (9)$$

(where $Ar^1$ is an aromatic group having 6–24 carbon atoms) and/or an arylenediamine derivative represented by the following general formula (10):

(10)

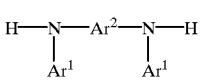

(where $Ar^1$ and $Ar^2$ are each independently an aromatic group having 6–24 carbon atoms) with an aryldihalide represented by the following general formula (11):

$$Ar^2(X)_2 \qquad (11)$$

(where $Ar^2$ is an aromatic group having 6–24 carbon atoms, and X is Cl, Br, F or I) in the presence of both a base and a catalyst composed of a trialkylphosphine and/or an arylphsphine and palladium compound.

13. The process according to any one of claims 4–9, which comprises reacting an aniline represented by the following general formula (12):

(12)

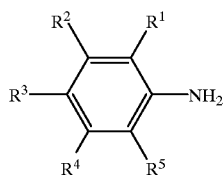

(where $R^1$–$R^5$ are each independently a hydrogen atom, an alkyl group having 1–20 carbon atoms, a thioalkyl group having 1–20 carbon atoms, and alkoxy group having 1–20 carbon atoms, a fluorine atom, a carbonyl group, a carboxyl group, a sulfonyl group, a sulfoxyl group, a nitro group or a cyano group) with an aryl dihalide represented by the following general formula (13):

(13)

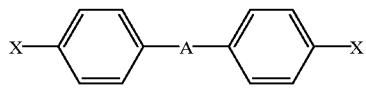

(where X is Cl, Br or I, and A is O, S, $SO_2$, CO, $CH_2$ or $C(CH_3)_2$) to produce a polyaryleneamine composed of a repeating unit represented by the following general formula (14):

(14)

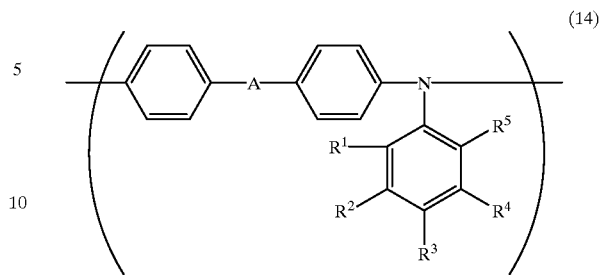

where A is O, S, $SO_2$, CO, $CH_2$ or $C(CH_3)_2$; $R^1$–$R^5$ are each independently a hydrogen atom, an alkyl group having 1–20 carbon atoms, a thioalkyl group having 1–20 carbon atoms, an alkoxy group having 1–20 carbon atoms, a fluorine atom, a carboxyl group, a sulfonyl group, a sulfoxyl group, a nitro group or a cyano group.

14. The process according to claim 12, wherein the trialkylphosphine is tri-tertiary butylphosphine.

15. The process according to claim 13, wherein the trialkylphosphine is tri-tertiary butylphosphine.

* * * * *